US012163263B2

(12) United States Patent
Sagerer-Foric (10) Patent No.: US 12,163,263 B2
(45) Date of Patent: Dec. 10, 2024

(54) PROCESS FOR THE PRODUCTION OF SPUNBONDED NONWOVEN

(71) Applicant: Lenzing Aktiengesellschaft, Lenzing (AT)

(72) Inventor: Ibrahim Sagerer-Foric, Vöcklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 356 days.

(21) Appl. No.: 17/787,070

(22) PCT Filed: Dec. 11, 2020

(86) PCT No.: PCT/EP2020/085770
§ 371 (c)(1),
(2) Date: Nov. 10, 2022

(87) PCT Pub. No.: WO2021/122377
PCT Pub. Date: Jun. 24, 2021

(65) Prior Publication Data
US 2023/0183886 A1  Jun. 15, 2023

(30) Foreign Application Priority Data
Dec. 17, 2019  (EP) .................................... 19217032

(51) Int. Cl.
*D04H 3/11* (2012.01)
*B29C 48/00* (2019.01)
(Continued)

(52) U.S. Cl.
CPC ........... *D04H 3/11* (2013.01); *B29C 48/0021* (2019.02); *B29C 48/05* (2019.02); *B29C 48/92* (2019.02);
(Continued)

(58) Field of Classification Search
CPC ........... B29C 2948/92428; B29C 2948/92438; B29C 2948/92447; B29C 2948/9279;
(Continued)

(56) References Cited

U.S. PATENT DOCUMENTS

| 5,589,125 A | 12/1996 | Zikeli et al. |
| 8,366,988 B2 * | 2/2013 | Chou ....................... D01D 5/14 |
| | | 264/234 |

(Continued)

FOREIGN PATENT DOCUMENTS

| EP | 3385430 A1 * | 10/2018 | .......... A61M 35/006 |
| EP | 17164645.8 | 10/2018 | |

(Continued)

OTHER PUBLICATIONS

International Written Opinion for International Application No. PCT/EP2020/085770, 5 pages.

*Primary Examiner* — Atul P. Khare
(74) *Attorney, Agent, or Firm* — Workman Nydegger (57) ABSTRACT

The invention relates to a process for the production of spunbonded nonwoven and a device for the production of spunbonded nonwoven, wherein, in the process, a spinning mass is extruded through a plurality of nozzle holes to form filaments, the filaments are drawn in the extrusion direction, precipitated at least partially by being subjected to a coagulation air stream comprising a coagulation liquid and deposited to form the spunbonded nonwoven. To establish a process which permits a cost-efficient and simple adjustment of the air permeability of the spunbonded nonwoven, it is suggested that the air permeability of the spunbonded nonwoven is adjusted on the basis of at least one parameter of the coagulation air stream in that the actual air permeability of the spunbonded nonwoven is measured, the difference between the actual air permeability and a predefined target (Continued)

Fig. 1 air permeability is determined and the at least one parameter of the coagulation air stream is changed as a function of the determined difference.

15 Claims, 2 Drawing Sheets

(51) Int. Cl.
    *B29C 48/05*         (2019.01)
    *B29C 48/92*         (2019.01)
    *D04H 3/013*        (2012.01)

(52) U.S. Cl.
    CPC ............... *B29C 2948/92428* (2019.02); *B29C 2948/9279* (2019.02); *B29C 2948/92923* (2019.02)

(58) Field of Classification Search
    CPC ........... B29C 48/92; B29C 48/05; D04H 3/11; D04H 3/16; D04H 3/163
    See application file for complete search history.

(56) References Cited

U.S. PATENT DOCUMENTS

| | | | | |
|---|---|---|---|---|
| 11,613,097 | B2* | 3/2023 | Carlyle | ..................... B32B 7/09 |
| | | | | 442/123 |
| 2008/0197522 | A1* | 8/2008 | Schemken | ............. B29C 48/05 |
| | | | | 264/40.6 |
| 2009/0186189 | A1* | 7/2009 | White | .................... D04H 1/492 |
| | | | | 428/196 |
| 2016/0289865 | A1* | 10/2016 | Park | ......................... D01D 4/00 |
| 2018/0282923 | A1* | 10/2018 | Carlyle | ................... A61L 15/28 |

FOREIGN PATENT DOCUMENTS

| | | | | |
|---|---|---|---|---|
| KR | 20190065411 A | * | 6/2019 | ............... D04H 3/02 |
| WO | 2018184038 A1 | | 10/2018 | |
| WO | WO-2018184039 A1 | * | 10/2018 | |

* cited by examiner

PROCESS FOR THE PRODUCTION OF SPUNBONDED NONWOVEN

This application is a 371 of International Patent Application No. PCT/EP2020/085770, titled "METHOD FOR PRODUCING SPUNBOND NONWOVEN", filed Dec. 11, 2020, which claims the benefit of European Patent Application No. 19217032.2, filed Dec. 17, 2019, which are incorporated herein by reference in their entirety.

The present invention relates to a process for the production of spunbonded nonwoven, wherein a spinning mass is extruded through a plurality of nozzle holes to form filaments, the filaments are drawn in the extrusion direction, precipitated at least partially by the application of a coagulation air stream comprising a coagulation liquid and deposited to form the spunbonded nonwoven.

PRIOR ART

The production of spunbonded nonwovens and, respectively, nonwoven fabrics by the spunbond process, on the one hand, and by the meltblown process, on the other hand, is known from the prior art. In the spunbond process (e.g., GB 2 114 052 A or EP 3 088 585 A1), the filaments are extruded through a nozzle and pulled off and drawn by a drawing unit located underneath. By contrast, in the meltblown process (e.g., U.S. Pat. No. 5,080,569 A, 4,380,570 A or 5,695,377 A), the extruded filaments are entrained and drawn by hot, fast process air as soon as they exit the nozzle. In both technologies, the filaments are deposited in a random orientation on a deposit surface, for example, a perforated conveyor belt, to form a nonwoven fabric, are carried to post-processing steps and finally wound up as nonwoven rolls.

Furthermore, from U.S. Pat. No. 3,755,527 A, for example, a plant for the production of thermoplastic nonwovens according to the meltblown process is known, wherein it is possible to vary the distance between the spinneret and the deposition of the nonwoven. A plant for the production of nonwoven fabrics according to the meltblown process with a variable distance between the spinneret and the deposition is also known from DE 199 13 162 C1, wherein, in addition, the spinneret and the deposition can be changed in terms of their angle relative to each other. The mechanical and internal properties of the nonwoven fabric can be changed and adjusted by varying the distance or, respectively, the angle between the spinneret and the deposition.

It is also known from the prior art to produce cellulosic spunbonded nonwovens according to the spunbond technology (e.g., U.S. Pat. No. 8,366,988 A) and according to the meltblown technology (e.g., U.S. Pat. Nos. 6,358,461 A and 6,306,334 A). A lyocell spinning mass is thereby extruded and drawn in accordance with the known spundbond or meltblown processes, however, prior to the deposition into a nonwoven, the filaments are additionally brought into contact with a coagulant in order to regenerate the cellulose and produce dimensionally stable filaments. The wet filaments are finally deposited in a random orientation as a nonwoven fabric.

Processes for the production of cellulosic spunbonded nonwovens, however, require technically complex and appropriately large-sized plants for their implementation, in comparison to processes for the production of thermoplastic spunbonded nonwovens, in particular in order to be able to produce and transport the lyocell spinning masses. In particular, the spinning mass lines between the spinning mass production and the spinnerets must have an appropriately solid design, as they have to withstand extremely high line pressures. Therefore, the proposed solutions as mentioned above for adjusting the mechanical properties of the obtained nonwoven fabrics, which have been developed for thermoplastic spunbonded nonwovens, may not be considered for processes for the production of cellulosic spunbonded nonwovens. In particular, a variation in the distance between spinnerets and deposition may not be employed for cellulosic spunbonded nonwovens.

From the state of the art (WO 2018/184038 A1, EP 3 385 435 A1), processes for the production of spunbonded nonwovens are known in which a spinning mass is extruded through a plurality of nozzle holes to form filaments, with the filaments being drawn in the extrusion direction. After extrusion, the filaments are subjected to a coagulation air stream containing a coagulation liquid, and thereby being at least partially precipitated, and finally deposited to form the spunbonded fabric. However, such processes are not able to specifically adjust the air permeability of the spunbonded fabric and keep it constant throughout the entire production process.

DISCLOSURE OF THE INVENTION

Therefore, the invention has the object of providing a process for the production of spunbonded nonwoven, which enables an inexpensive and technically simple adjustment and a reliable keeping constant of the air permeability of the spunbonded nonwoven.

The invention achieves the object that is posed in that the air permeability of the spunbonded nonwoven is adjusted on the basis of at least one parameter of the coagulation air stream in that the actual air permeability of the spunbonded nonwoven is measured, the difference between the actual air permeability and a predefined target air permeability is determined and the at least one parameter of the coagulation air stream is changed as a function of the determined difference.

In particular, the invention is based on the finding that the air permeability of the spunbonded nonwoven can be adjusted by changing at least one parameter of the coagulation air stream.

In this way, a technically particularly simple process for the production of a spunbonded nonwoven with an adjusted air permeability can be provided. As there is no need for an adjustment of the height of the solid platforms and conveyor belts, the process can be performed without any extensive and costly structural changes to existing spunbond systems, and thus the costs as well as the complexity of the production plants can be reduced.

By changing, according to the invention, at least one parameter of the coagulation air stream, which acts on the extruded and drawn filaments before they are deposited into the spunbonded nonwoven and coagulates them at least partly, the air permeability of the spunbonded nonwoven can surprisingly be influenced significantly without other mechanical properties such as the weight per unit area being changed at the same time. The coagulation air stream can namely, on the one hand, control the degree of coagulation of the extruded filaments, thus ensuring an increased or reduced adhesion of the filaments, and can, on the other hand, influence the degree of turbulence of the filaments before they are deposited into the spunbonded nonwoven. Both adhesion and turbulence can thereby be crucial for the air permeability of the spunbonded nonwoven that is obtained. In addition, the coagulation air stream can be varied in fine gradations and very quickly by a plurality of parameters, which provides a clear advantage over conventional solutions, in particular the mechanical adjustment of the production plant.

According to the invention, an unexpected effect of a spunbonded-nonwoven deposition is thereby achieved, via which the air permeability of the spunbonded nonwoven can be reliably influenced without changing the throughput of spinning mass, the weight per unit area of the spunbonded nonwoven, the drawing air stream or the distance between the spinneret and the deposit surface for depositing the filaments, namely by changing at least one parameter of the coagulation air stream. It has been shown that the momentum of the coagulation air stream, which is sprayed in especially sideways underneath the spinneret, has such a clear effect on the filament curtain made of drawn filaments that the orientation of the filaments is clearly influenced before they hit the deposit surface. As a result of a change in the orientation of the filaments, the internal structure of the spunbonded nonwoven and thus also the air permeability may subsequently change.

If, in addition, the actual air permeability of the spunbonded nonwoven is measured, the difference between the actual air permeability and a predefined target air permeability is determined and at least one parameter of the coagulation air stream is changed as a function of the determined difference, a spunbonded nonwoven can be obtained with a desired target air permeability in a particularly reproducible and reliable fashion. In this way, a feedback loop can be formed, whereby it is possible to respond quickly to deviations in the measured actual air permeability from a predetermined target air permeability. Depending on the determined difference, a change in one or several parameters of the coagulation air stream can, in fact, be determined, which lead to a change in air permeability, so that the difference between the actual air permeability and the target air permeability will become lower as the process progresses or, respectively, the actual air permeability will approach the target air permeability.

For the purposes of the present invention, it is noted that, within the meaning of the present disclosure, a spunbonded nonwoven is understood to be a nonwoven fabric which is formed directly by depositing extruded filaments, wherein the filaments are essentially continuous filaments and are deposited in a random orientation to form the spunbonded nonwoven.

The air permeability of the spunbonded nonwoven is understood to mean the air permeability according to ASTM D 737, DIN 53887, EN ISO 9237, WSP 70.1 or comparable standards.

For the purposes of the present invention, a coagulation air stream is understood to mean a fluid containing water and/or a fluid containing coagulant, for example, gas, mist, vapour, etc.

In a possible embodiment of the invention, the parameters of the coagulation air stream can be changed manually as a function of the determined difference, for example, using tables or empirical values. In a further embodiment, the parameters of the coagulation air stream can be changed by an automatic or computer-aided regulation, for example, by means of a PID controller.

If the at least one parameter is selected from the group consisting of the air pressure, the angle and the starting position of the coagulation air stream or, respectively, the amount of coagulation liquid in the coagulation air stream, the reliability and the reproducibility of the process can be enhanced further.

In doing so, the angle of the coagulation air stream may preferably be the angle enclosed between the coagulation air stream and the filaments, while the starting position of the coagulation air stream may preferably be the starting point or, respectively, the point of origin of the coagulation air stream.

Specifically the flow conditions in the area where the filaments are deposited into the spunbonded nonwoven and thus also the turbulence of the extruded, drawn and partially coagulated filaments can, in fact, be influenced and consciously controlled via the air pressure of the coagulation air stream and, likewise, also via the angle or, respectively, the starting position of the coagulation air stream relative to the filaments.

In addition, via the amount of coagulation liquid in the coagulation air stream, the degree of coagulation of the filaments can be influenced and, thus, it can be controlled as to whether the filaments exhibit more or less adhesions before they are deposited, in particular with a higher degree of coagulation resulting in fewer adhesions and ultimately a more homogeneous, denser deposition of the filaments in the spunbonded nonwoven.

By changing the flow conditions and/or the turbulence of the filaments and/or the adhesion of the filaments, their orientation before they are deposited is influenced in such a way that the internal structure, i.e., the random orientation of the filaments, of the spunbonded nonwoven and thus the air permeability are subsequently changed.

The reproducibility of the process can be improved further if the coagulation air stream is controlled as a function of the at least one parameter by means of a coagulation device. Thus, an at least partial automated adjustment of the coagulation air stream can, in fact, be achieved by the coagulation device by means of the parameters.

In this case, the coagulation device may comprise at least one nozzle variable with regard to the exit angle and/or its position and a metering device. The coagulation air stream can thus be reliably controlled via the nozzle, since the nozzle is able to arbitrarily adjust the exit air pressure, the exit angle and the position of the coagulation air stream or, respectively, its distance from the extruded filaments. In addition, the amount of coagulation liquid in the coagulation air stream can thereby be controlled via a metering device assigned to the nozzle. The coagulation device can thus control the coagulation air stream in a reproducible fashion by means of the parameters.

The nozzles of the coagulation device can preferably be single-substance nozzles for generating and controlling the coagulation air stream, wherein the pressure may range, in particular, from 1 bar to 50 bar. Furthermore, the nozzles of the coagulation device can preferably be two-substance nozzles for generating and controlling the coagulation air stream, wherein the pressure may range, in particular, from 1 bar to 20 bar. According to the invention, both single-substance and two-substance nozzles allow a reliable adjustment of the fineness of the nebulization of the coagulation liquid and thus a reliable regulation of the coagulation air stream.

If the spunbonded nonwoven undergoes at least one of the steps including washing, hydroentanglement and drying before the actual air permeability is determined, the reliability and the reproducibility of the process can be increased further. In particular, the air permeability of the spunbonded nonwoven can, in fact, be influenced further by post-treatment steps such as, for example, washing or hydroentanglement or, respectively, drying. Due to the fact that the determination of the actual air permeability occurs downstream of such treatment steps, any influences of such steps on the desired air permeability of the spunbonded nonwoven can be avoided.

The process can be improved further if the actual air permeability is measured by means of a detection device. Such a detection device may preferably be an online detection device, which continuously monitors the spunbonded nonwoven in the ongoing production process without the process having to be interrupted. Such a detection device may, in particular, be a measuring device or a testing device which is suitable for a non-destructive determination of the air permeability of the spunbonded nonwoven.

In addition, by means of a control unit connected to the detection device, the difference between the actual air permeability measured by the detection device and the target air permeability stored in the control unit can be determined. By means of the control unit, in particular, an automated determination of the difference between actual and target air permeabilities can take place, wherein the control unit is able to use a target air permeability stored in a memory, for example. In doing so, the control unit may be, for example, an autonomous control unit, such as a microprocessor, computer, mobile terminal, etc., or it can be integrated into an existing guidance system or control system, respectively, as a part thereof.

Furthermore, as a function of the determined difference, the control unit can output a control signal for changing a parameter of the coagulation air stream to a coagulation device regulating the coagulation air stream. In this case, the control unit is connected to the coagulation device and can, for example, adjust the parameters of the coagulation air stream and, thus, the air permeability of the spunbonded nonwoven in real time after the difference between actual and target air permeabilities has been determined. A complete regulation system for the air permeability of the spunbonded nonwoven can thus be created.

Since the spinning masses used in case of the production of cellulosic spunbonded nonwovens exhibit a high dilution with cellulose contents of only 3 to 17%, more process air per kg of product is required in cellulosic spunbond technologies as compared to thermoplastic spunbond technologies. In comparison to thermoplastic spunbond systems, this leads to a greater demand for drawing air as well as coagulant and solvent, which have to be discharged after the extrusion of the moulded bodies, with the productivity remaining the same. This means that more process air will hit the same deposit surface at a higher speed and this process air will also be loaded with a lot of liquid. That leads to a requirement for systems that are larger and more massive than the extruders used in thermoplastic spunbond or meltblown processes. Moreover, the solid lyocell spinning mass lines have to withstand high pressures and are neither flexible nor quickly adjustable. Therefore, due to the high technical complexity, an adjustment of the height of the deposition and/or the spinnerets for changing the mechanical and internal properties of the spunbondeded nonwoven will be out of the question in case of cellulosic spunbonded nonwovens.

The process according to the invention is thus particularly suitable for the production of a cellulosic spunbonded nonwoven, wherein the spinning mass is a lyocell spinning mass, i.e., a solution of cellulose in a direct solvent for cellulose. Such a direct solvent for cellulose is a solvent in which the cellulose is present in a state of having been dissolved in a non-derivatized form. Preferably, this may be a mixture of a tertiary amine oxide, such as NMMO (N-methylmorpholine-N-oxide), and water. Alternatively, however, also ionic liquids, or mixtures with water, are, for example, suitable as direct solvents. In this case, the content of cellulose in the spinning mass may range from 3% by weight to 17% by weight, in preferred embodiment variants from 5% by weight to 15% by weight, and in particularly preferred embodiment variants from 6% by weight to 14% by weight.

Surprisingly, it has been shown that the distance between the spinneret and the deposit surface can be significantly higher in the cellulosic spunbond process according to the invention than in thermoplastic spunbond processes without the quality of the spunbonded nonwoven being adversely affected.

If the distance between the spinneret and the deposit surface for depositing the filaments is between 100 mm and 5000 mm, sufficient space can, in fact, be created between the spinneret and the deposit surface in order to place the coagulation device in the area underneath the spinneret to generate a controllable coagulation air stream. The distance between the spinneret and the deposit surface is preferably between 300 mm and 4000 mm, particularly preferably between 500 mm and 2000 mm. The position and/or the angle of one or several nozzles of the coagulation device can, in this case, be reliably adjusted, and the coagulation air stream can thus be directed onto the filaments.

In addition, it has surprisingly been found that the spunbonded nonwoven is deposited evenly without spinning errors, despite the large distance between the spinneret and the deposit surface. In addition, due to the large distance in comparison to thermoplastic spunbond processes, a destruction of the spunbonded nonwoven in the drawing air stream can be reliably avoided, since otherwise, if there are small distances, turbulences might arise in the drawing air stream due to the high amounts of drawing air in processes according to the invention for the production of cellulosic spunbonded nonwovens.

Furthermore, it has been shown that a change in the distance between the spinneret and the deposit surface has only a very minor effect on the internal structure and the air permeability of the spunbonded nonwoven in the process according to the invention for the production of cellulosic spunbonded nonwovens using a lyocell spinning mass, in contrast to thermoplastic spunbond processes.

The throughput of cellulose per spinneret may preferably range between 5 kg/h per metre of spinneret length and 500 kg/h per metre of spinneret length.

In this case, a particularly reliable coagulation of the extruded filaments can be achieved if the coagulation liquid is a mixture of water and a direct solvent for cellulose. In particular, the coagulation liquid may be a mixture of demineralized water and 0% by weight to 40% by weight of NMMO, preferably 10% by weight to 30% by weight of NMMO, particularly preferably 15% by weight to 25% by weight of NMMO.

The amount of coagulation liquid in the coagulation air stream may, in this case, preferably range from 50 l/h to 10,000 l/h, furthermore preferably from 100 l/h to 5,000 l/h, particularly preferably from 500 l/h to 2,500 l/h per metre of coagulation nozzle.

For drawing the filaments, the spinneret may comprise a drawing device which directs a drawing air stream from the spinneret onto the extruded filaments. In particular, the drawing air stream can have a pressure ranging from 0.05 bar to 5 bar, preferably from 0.1 bar to 3 bar, particularly preferably from 0.2 bar to 1 bar. In particular, the drawing air stream can furthermore have a temperature ranging from 20° C. to 200° C., preferably from 60° C. to 160° C., particularly preferably from 80° C. to 140° C.

Furthermore, it is the object of the invention to provide a device for the production of spunbonded nonwoven according to the preamble of claim 12, which allows the air permeability of the spunbonded nonwoven to be controlled and, respectively, adjusted in a technically and structurally simple manner.

The object that is posed is achieved by the characterizing features of claim 12.

If the device comprises a detection device for measuring the actual air permeability of the spunbonded nonwoven, with the coagulation device being connected to the detection device for controlling the coagulation air stream as a function of the actual air permeability, a direct feedback connection can, in fact, be established between the measured actual air permeability of the spunbonded nonwoven and the coagulation device.

As a result, for example, deviations of the actual air permeability from a desired target air permeability can be detected quickly and an adjustment of the coagulation air stream can be achieved by an appropriate control of the coagulation device, whereby the air permeability of the spunbonded nonwoven can be adjusted in a desired direction. In addition, the detection device enables a quick online measurement of the actual air permeability during the ongoing production process and, thanks to the direct connection to the coagulation device, can respond to changes in the production process without any major delay. A technically and structurally particularly simple device for producing a spunbonded nonwoven can be created in this way, which, in addition, permits a reliable adjustment of the air permeability of the spunbonded nonwoven.

If, in the device, the coagulation device is furthermore connected to the detection device via a control unit, with a target air permeability being stored in the control unit, the reliability of the device can be improved further, since deviations of the actual air permeability from the target air permeability can be determined directly by the control unit and the coagulation device can be controlled as a function of such deviations.

If the detection device is arranged between the spinneret and a winding of the spunbonded nonwoven, a direct measurement of the actual air permeability can take place during the production process, whereby it becomes possible to respond directly to deviations in air permeability. In this case, the detection device can preferably be arranged, for example, between the spinneret and a washing, between a washing and a drying, between a washing and a hydroentanglement, between a hydroentanglement and a drying or between a drying and a winding of the spunbonded nonwoven, in each case, based on the transport direction of the conveyor belt.

In this case, the detection device is preferably arranged directly downstream of the drying of the spunbonded nonwoven, since the actual air permeabilities measured after drying reliably reflect the actual air permeability of the finished spunbonded nonwoven. The drying may, in this case, involve several drying steps, with the detection device being arranged in particular after the final drying step. A particularly reliable device can thus be created.

With the spinnerets of the process according to the invention or, respectively, the device according to the invention, single-row slot nozzles, multi-row needle nozzles or preferably column nozzles with lengths of 0.1 m to 6 m as known from the prior art (U.S. Pat. Nos. 3,825,380 A, 4,380,570 A, WO 2019/068764 A1) may preferably be used.

BRIEF DESCRIPTION OF THE DRAWINGS

The embodiment variants of the invention are described in more detail below with reference to the drawings.

WAYS OF IMPLEMENTING THE INVENTION

Figure 1:
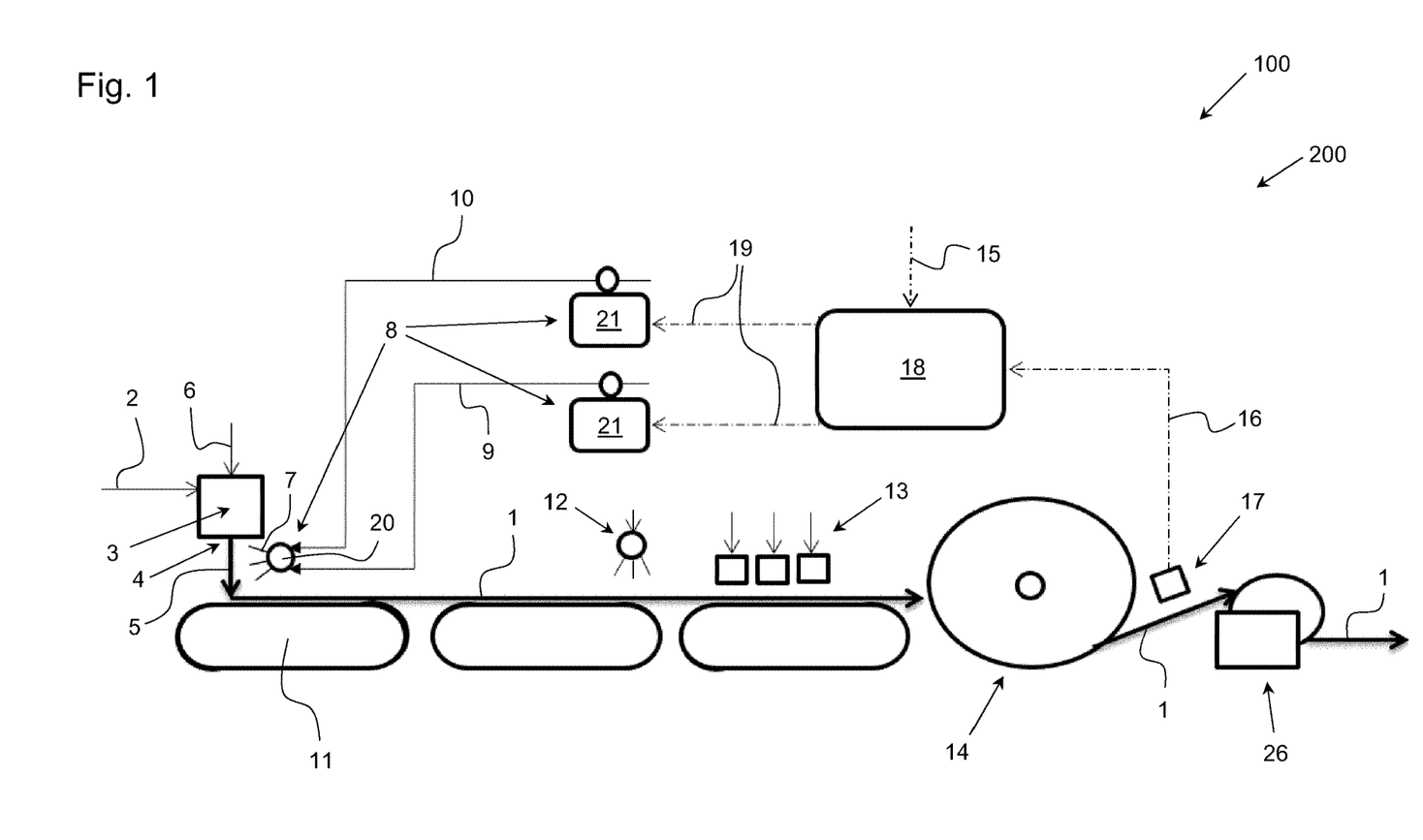
FIG. 1 shows a schematic illustration of the process sequence according to a first embodiment variant of the process.

FIG. 1 shows a schematic illustration of the process 100 for the production of cellulosic spunbonded nonwoven 1 and a corresponding device 200 on the basis of which the process 100 is performed. In a first process step, a spinning mass 2 is produced from a cellulosic raw material and supplied to one or several spinnerets 3 of the device 200. The cellulosic raw material for the production of the spinning mass 2, which is not shown in further detail in the figures, can be a conventional pulp made of wood or other plant-based starting materials. However, it is also conceivable that the cellulosic raw material consists of production waste of the spunbonded nonwoven or recycled textiles.

The spinning mass 2 is then extruded in the spinneret 3 through a plurality of nozzle holes 4 to form the filaments 5. By supplying drawing air 6 to a drawing unit in the spinneret 3, the filaments 5 are drawn by means of a drawing air stream as they exit from the spinneret 3. In doing so, the drawing air 6 can emerge from openings in the spinneret 3 between the nozzle holes 4 and can be directed as a drawing air stream directly onto the extruded filaments 5.

After or already in the course of drawing, the extruded filaments 5 are subjected to a coagulation air stream 7, which is generated by a coagulation device 8. For this purpose, both a coagulation air 9 and a coagulation liquid 10 are supplied to the coagulation device 8, with the coagulation air stream 7 generated by the coagulation device 8 comprising the coagulation liquid 10. Due to the contact of the filaments 5 with the coagulation air stream 7 and the coagulation liquid 10 contained therein, the filaments 5 are precipitated at least partly, which, in particular, reduces adhesions between the individual extruded filaments 5.

The filaments 5 that have been drawn and precipitated at least partly are then deposited in a random orientation on a conveyor belt 11 to form the spunbonded nonwoven 1. With the conveyor belt 11, the spunbonded nonwoven 1 is then passed on to further treatment steps 12, 13, 14.

In order to control the air permeability of the spunbonded nonwoven 1 or, respectively, to obtain a spunbonded nonwoven 1 with a defined target air permeability 15, the actual air permeability 16 of the spunbonded nonwoven 1 is preferably measured by means of a detection device 17 and transferred to a control unit 18 connected to the detection device 17. The control unit 18 then determines a difference between the measured actual air permeability 16 and the target air permeability 15, the coagulation air stream 7 being controlled by the coagulation device 8 on the basis of the difference.

For this purpose, the coagulation device 8 is connected to the control unit 18, which sends control signals 19 to the coagulation device 8 in order to change at least one parameter of the coagulation air stream 7, namely the air pressure, the angle and the starting position, or the amount of coagulation liquid 10 in the coagulation air stream 7.

For controlling the coagulation air stream 7, the coagulation device 8 has a nozzle 20 variable in terms of the exit angle and its position. Metering devices 21, on the one hand, for the coagulation liquid 10 for controlling the amount of coagulation liquid 10 in the coagulation air stream 7 and, on the other hand, for the coagulation air 9 for controlling the pressure are assigned to the nozzle 20. A feedback loop is thus created between the coagulation device 8 and the detection device 17, which can achieve and keep constant a target air permeability 15 in the finished spunbonded nonwoven 1 in a fully automatic fashion by regulating the coagulation air stream 7. Keeping the air permeability constant in this way may prove to be particularly advantageous also in case of fluctuations in the cellulose raw material.

Figure 2A:
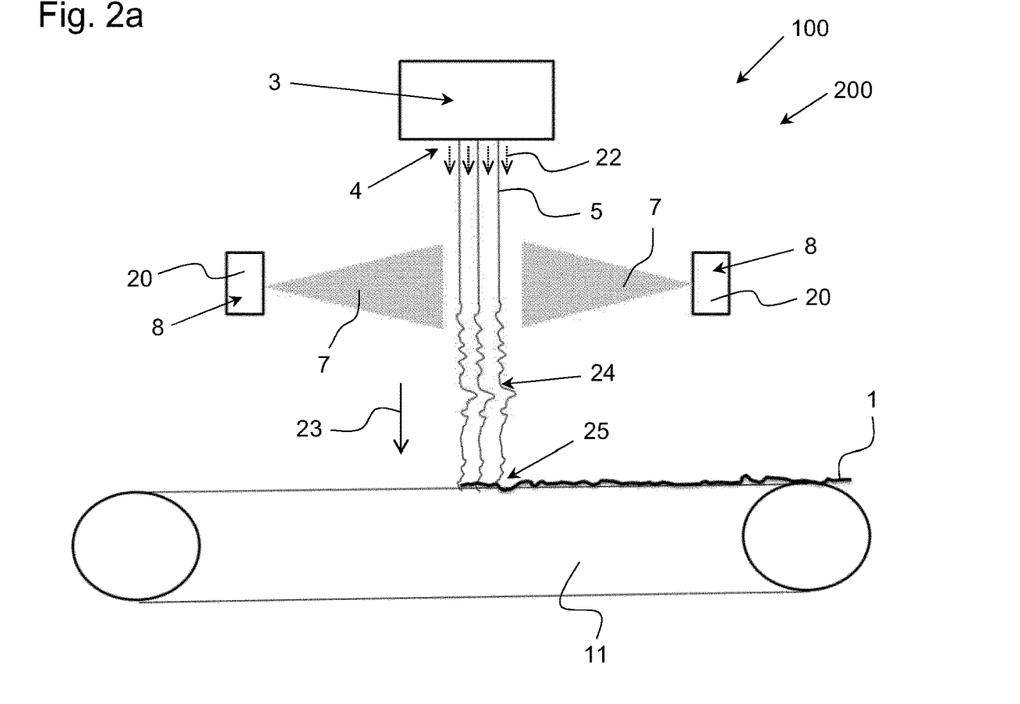
FIG. 2a shows a schematic detailed view of the filament extrusion according to the process in FIG. 1 in a first state.
Figure 2B:
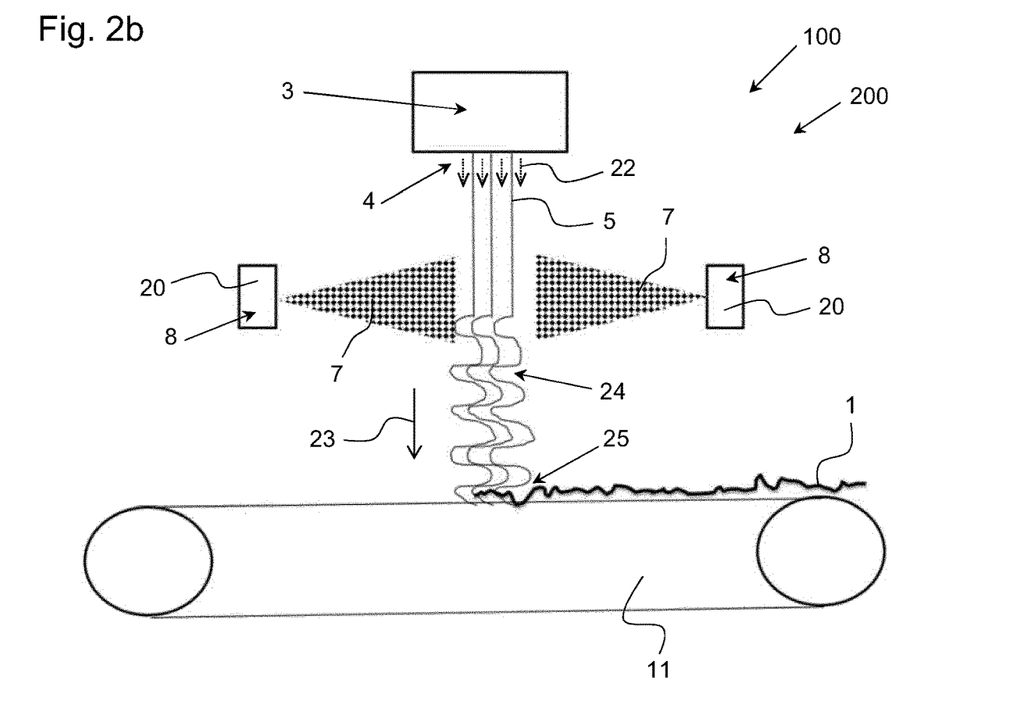
FIG. 2b shows a schematic detailed view of the filament extrusion according to the process in FIG. 1 in a second state.

The control of the air permeability of the spunbonded nonwoven 1 during the extrusion of the moulded bodies 5 from the spinneret 3 is illustrated in detail in FIGS. 2a and 2b. FIG. 2a shows the area of the spinneret 3 of the device 200 of FIG. 1, wherein the moulded bodies 5 are extruded from the nozzle holes 4 of the spinneret 3 and are drawn by the drawing air stream 22 in the extrusion direction 23.

The drawn filaments 5 then pass through the coagulation air stream 7, which is generated from the nozzles 20 of the coagulation device 8. In this case, the nozzles 20 can be arranged opposite to each other, on both sides of the spinneret 3. In further embodiments, which are not illustrated, it is also possible that the nozzles 20 are arranged circularly around the extruded filaments 5, or that several nozzles 20 are arranged around the extruded filaments 5.

Depending on the parameters of the coagulation air stream 7, turbulences 24 are then generated in the filaments 5, which affect the deposition of the filaments 5 on the conveyor belt 11. For example, a higher air pressure of the coagulation air stream 7 leads to a stronger turbulence 24 of the filaments 5, as is illustrated in FIG. 2b. In addition, for example, the amount of coagulation liquid 10 might influence the adhesions between the filaments 5. Ultimately, this will also result in an altered random orientation 25 of the filaments 5 in the finished spunbonded nonwoven 1, which, in turn, will influence the air permeability.

In a further embodiment variant, which is not shown in further detail in the figures, the nozzles 20 of the coagulation device 8 are designed as single-substance nozzles, which allow the coagulation liquid 10 to be reliably nebulized in the coagulation air 9.

In yet another embodiment variant, which is not shown in further detail in the figures, the nozzles 20 of the coagulation device 8 are designed as two-substance nozzles, which likewise allow the coagulation liquid 10 to be reliably nebulized in the coagulation air 9.

In a further embodiment, the nozzles 20 are designed as nozzle bars, wherein it is possible to adjust both the exit angle and the horizontal and vertical positions of the nozzle bar during the operation.

In another embodiment variant, which is not shown in further detail in the figures, a positioning device is assigned to each of the nozzles 20 for controlling the angle and the position of the nozzles 20. Such a control may also be effected via the control unit 18. In doing so, the positioning device can specifically align the nozzles 20 in terms of their angle and their position, for example, via electric motors so that the coagulation air stream 7 can be directed more in the direction of the spinneret 3 or more in the extrusion direction 23 or, respectively, can be positioned specifically opposite to the filaments 5.

After the filaments 5 have been deposited on the conveyor belt 11 to form the spunbonded nonwoven 1, the spunbonded nonwoven undergoes further post-processing steps. First, the spunbonded nonwoven 1 undergoes a washing 12, which removes the residues of the direct solvent from the spunbonded nonwoven 1. In addition, the spunbonded nonwoven 1 undergoes a hydroentanglement 13, which may additionally change the internal structure of the spunbonded nonwoven 1. Finally, the spunbonded nonwoven 1 may pass through a drying 14 in order to obtain a finished spunbonded nonwoven 1, wherein the process 100 is concluded by an optional winding 26 and/or packing process.

According to different embodiment variants, the detection device 17 can be provided at different points of the device 200 or the process 100, respectively. Thus, the detection device 17 is arranged—as shown in FIG. 1—directly downstream of the drying 14 of the spunbonded nonwoven 1, i.e., without any intermediate treatment or processing steps. As a result, the detection device 17 can measure the actual air permeability 16 of the finished spunbonded nonwoven 1 and, thus, can rule out further changes due to downstream processing steps. As mentioned above, the internal structure and thus also the air permeability of the spunbonded nonwoven 1 can be altered further, in particular via a hydroentanglement 13. By arranging the detection device 17 downstream of the hydroentanglement 13, or specifically downstream of the drying 14, the effects of the hydroentanglement 13 can be compensated for by adjusting the air permeability via the coagulation air stream 7.

In further embodiment variants, the detection device 17 can, however, also be arranged, for example, upstream of the washing 12, between the washing 12 and the hydroentanglement 13 or between the hydroentanglement 13 and the drying 14.

In a further embodiment variant, which is not shown in further detail in the figures, the device 200, 201 or the process 100, 101, respectively, may comprise at least two spinnerets 3 arranged consecutively in the conveying direction of the conveyor belt 11, wherein filaments 5 are, in each case, extruded from at least a first spinneret 3 and a second spinneret and are drawn and wherein the filaments 5 of the first spinneret 3 are deposited on the conveyor belt 11 to form a first spunbonded nonwoven 1 and the filaments of the second spinneret are deposited on the conveyor belt 11 to form a second spunbonded nonwoven. In doing so, the second spunbonded nonwoven is deposited on the conveyor belt 11 over the first spunbonded nonwoven 1 in order to form a multi-layered spunbonded nonwoven. In the multi-layered spunbonded nonwoven, the first and the second spunbonded nonwovens 1 are detachably or permanently interconnected.

The multi-layered spunbonded nonwoven can also be formed in analogously the same manner by superimposing three or more spunbonded nonwovens from three or more spinnerets.

In a further embodiment variant, the first and the second spunbonded nonwovens 1 are permanently interconnected by the hydroentanglement 13 to form the multi-layered spunbonded nonwoven.

In another alternative embodiment variant, the multi-layered spunbonded nonwoven can be separated into the at least first and the second spunbonded nonwoven 1 in a further process step, preferably after the washing 12.

The first and the second spunbonded nonwovens 1 may each have different air permeabilities in the multi-layered spunbonded nonwoven and, thus, can form a multi-layered spunbonded nonwoven 1 with an air permeability variable in cross-section. This can be achieved in one embodiment variant in that a coagulation device 8, which is able to adjust the coagulation air stream 7 for each spinneret 3 separately, is assigned to each spinneret 3. Such a multi-layered spunbonded nonwoven 1 might be particularly suitable for applications in gas and liquid filters, high-performance filters or the like.

EXAMPLES

The process according to the invention is illustrated below on the basis of several examples. In each case, spunbonded nonwovens were produced according to the process forming the subject-matter, and the air permeabilities were measured using a detection device.

In all examples, a TEXTEST FX3340 MinAir air permeability tester was used as the detection device for measuring the air permeabilities of the spunbonded nonwovens. In doing so, the settings of the detection device were chosen such that the air permeabilities were measured in accordance with ISO 9237:1995 (ÖNORM EN ISO 9237: 1995 11 01).

In each of the examples, cellulosic spunbonded nonwovens were produced from a lyocell spinning mass, with a solution of cellulose in a mixture of water and NMMO being used as the spinning mass.

The cellulose throughput per spinneret amounted to 300 kg/h/m in all examples. The distance between the spinneret and the deposition (DCD/"The Collector Distance") was kept constant in all examples and, in each case, amounted to 1000 mm. The drawing air pressure of the drawing air stream was 0.5 bar in each of the examples.

Example 1

In a first example, the spunbonded nonwovens were produced, as described above, by means of the process according to the invention. In this case, the spunbonded nonwovens that were produced had weights per unit area of between 10 and 100 g/m². In each case, the air pressure of the coagulation air stream was kept constant at 1.5 bar, and the amount of coagulation liquid in the coagulation air stream was varied, in each case, between 500 l/h and 1000 l/h, relative to all weights per unit area. The air permeabilities were then determined using the above-described method.

Table 1 shows the measured air permeabilities of the spunbonded nonwovens produced according to Example 1. This shows that the variation in the amount of coagulation liquid in the coagulation air stream has a profound effect on the air permeability of the produced spunbonded nonwovens, despite otherwise identical process parameters.

Example 2

In a second example, the spunbonded nonwovens were again produced by means of the process according to the invention, as described initially. In this case, the produced spunbonded nonwovens also exhibited weights per unit area of between 10 and 100 g/m². In contrast to Example 1, the amount of coagulation liquid in the coagulation air stream was, in each case, kept constant at 750 l/h, and the air pressure of the coagulation air stream was varied, in each case, between 1.0 and 2.0 bar, relative to all weights per unit area. The air permeabilities were then determined using the above-described method.

Table 2 shows the measured air permeabilities of the spunbonded nonwovens produced according to Example 2. This shows that the variation in the air pressure of the coagulation air stream has a profound effect on the air permeability of the produced spunbonded nonwovens, despite otherwise identical process parameters.

In Examples 1 and 2, it is thus demonstrated that the air permeability of the spunbonded nonwoven can be reliably controlled and, respectively, adjusted by changing a parameter of the coagulation air stream (in particular the air pressure and the amount of coagulation liquid).

TABLE 1

Measured air permeabilities according to Example 1

| Weight per unit area (g/m²) | air pressure of the coagulation air stream (bar) | amount of coagulation liquid (l/h) | air permeability (l/m² · s) |
|---|---|---|---|
| 10 | 1.5 | 500 | <3000 |
| 10 | 1.5 | 750 | 3000-5000 |
| 10 | 1.5 | 1000 | >5000 |
| 20 | 1.5 | 500 | <2500 |
| 20 | 1.5 | 750 | 2500-4500 |
| 20 | 1.5 | 1000 | >4500 |
| 30 | 1.5 | 500 | <2000 |
| 30 | 1.5 | 750 | 2000-4000 |
| 30 | 1.5 | 1000 | >4000 |
| 40 | 1.5 | 500 | <1500 |
| 40 | 1.5 | 750 | 1500-3500 |
| 40 | 1.5 | 1000 | >3500 |
| 50 | 1.5 | 500 | <1000 |
| 50 | 1.5 | 750 | 1000-3000 |
| 50 | 1.5 | 1000 | >3000 |
| 100 | 1.5 | 500 | <500 |
| 100 | 1.5 | 750 | 500-2500 |
| 100 | 1.5 | 1000 | >2500 |

TABLE 2

Measured air permeabilities according to Example 2

| Weight per unit area (g/m²) | amount of coagulation liquid (l/h) | air pressure of the coagulation air stream (bar) | air permeability (l/m² · s) |
|---|---|---|---|
| 10 | 750 | 1.0 | <3000 |
| 10 | 750 | 1.5 | 3000-5000 |
| 10 | 750 | 2.0 | >5000 |
| 20 | 750 | 1.0 | <2500 |
| 20 | 750 | 1.5 | 2500-4500 |
| 20 | 750 | 2.0 | >4500 |
| 30 | 750 | 1.0 | <2000 |
| 30 | 750 | 1.5 | 2000-4000 |
| 30 | 750 | 2.0 | >4000 |
| 40 | 750 | 1.0 | <1500 |
| 40 | 750 | 1.5 | 1500-3500 |
| 40 | 750 | 2.0 | >3500 |
| 50 | 750 | 1.0 | <1000 |
| 50 | 750 | 1.5 | 1000-3000 |
| 50 | 750 | 2.0 | >3000 |
| 100 | 750 | 1.0 | <500 |
| 100 | 750 | 1.5 | 500-2500 |
| 100 | 750 | 2.0 | >2500 |

The invention claimed is:

1. A process for the production of a spunbonded nonwoven, wherein a spinning mass is extruded through a plurality of nozzle holes to form filaments, the filaments are drawn in the extrusion direction, precipitated at least partially by being subjected to a coagulation air stream comprising a coagulation liquid and deposited to form the spunbonded nonwoven, wherein the air permeability of the spunbonded nonwoven is adjusted by means of at least one parameter of the coagulation air stream in that the actual air permeability of the spunbonded nonwoven is measured, the difference between the actual air permeability and a predefined target air permeability is determined and the at least one parameter of the coagulation air stream is changed as a function of the determined difference, and wherein the spunbonded nonwoven undergoes at least one of the following steps before the actual air permeability is determined: a washing, a hydroentanglement, or a drying.

2. A process according to claim 1, wherein the at least one parameter is selected from the group consisting of the air pressure, the angle, and the starting point of the coagulation air stream and the amount of coagulation liquid in the coagulation air stream.

3. A process according to claim 1, wherein the coagulation air stream is controlled as a function of the at least one parameter by means of a coagulation device.

4. A process according to claim 3, wherein the coagulation device comprises a nozzle variable with regard to the exit angle and/or its position and a metering device assigned to the nozzle, with the coagulation air stream being controlled via the at least one nozzle and the amount of coagulation liquid in the coagulation air stream being controlled via the metering device assigned to the nozzle.

5. A process according to claim 1, wherein the actual air permeability is measured using a detection device.

6. A process according to claim 5, wherein, by means of a control unit connected to the detection device, the difference between the actual air permeability measured by the detection device and the target air permeability is determined.

7. A process according to claim 6, wherein the control unit outputs at least one control signal for changing a parameter of the coagulation air stream to a coagulation device regulating the coagulation air stream, as a function of the determined difference.

8. A process according to claim 1, wherein the spunbonded nonwoven is a cellulosic spunbonded nonwoven and the spinning mass is a solution of cellulose in a direct solvent.

9. A process according to claim 8, wherein the direct solvent is a tertiary amine oxide.

10. A process according to claim 1, wherein the coagulation liquid is a mixture of water and a direct solvent for cellulose.

11. A process according to claim 10, wherein the direct solvent for cellulose is a tertiary amine oxide.

12. A device for the production of a spunbonded nonwoven, comprising at least one spinneret for extruding a spinning mass into filaments, the at least one spinneret comprising a drawing device for drawing the extruded filaments by means of a drawing air stream, comprising a coagulation device for subjecting the filaments to and at least partially precipitating the filaments with a coagulation air stream comprising a coagulation liquid, and comprising a conveyor belt for depositing the filaments and forming the spunbonded nonwoven, wherein the device comprises a detection device for measuring the actual air permeability of the spunbonded nonwoven, wherein the coagulation device is connected to the detection device in order to control the coagulation air stream as a function of the actual air permeability, and wherein the spunbonded nonwoven undergoes at least one of the following steps before the actual air permeability is determined: a washing, a hydroentanglement, or a drying.

13. A device according to claim 12, wherein the coagulation device is connected to the detection device via a control unit, with a target air permeability being stored in the control unit.

14. A device according to claim 12, wherein the detection device is arranged between the at least one spinneret and a winding of the spunbonded nonwoven in the transport direction of the conveyor belt.

15. A device according to claim 12, wherein the detection device is arranged directly downstream of a drying of the spunbonded nonwoven.

* * * * *